United States Patent [19]

Peiffer

[11] Patent Number: 4,847,342

[45] Date of Patent: Jul. 11, 1989

[54] CATIONIC-HYDROGEN BONDING TYPE HYDROPHOBICALLY ASSOCIATING COPOLYMERS

[75] Inventor: Dennis G. Peiffer, East Brunswick, N.J.

[73] Assignee: Exxon Research and Engineering Company, Florham Park, N.J.

[21] Appl. No.: 135,829

[22] Filed: Dec. 21, 1987

[51] Int. Cl.$^4$ ............................ C08F 4/30; C08F 4/34
[52] U.S. Cl. ................................ 526/229; 526/232.1
[58] Field of Search .................... 526/304, 229, 232.1

[56] References Cited

U.S. PATENT DOCUMENTS

| | | | |
|---|---|---|---|
| 2,654,729 | 7/1952 | Price | 526/304 |
| 2,777,872 | 1/1957 | Shacklett | 526/304 |
| 2,833,650 | 5/1958 | Shacklett | 526/304 |
| 2,923,701 | 2/1960 | Schuller et al. | 526/304 |
| 2,980,657 | 4/1961 | Melamed | 526/304 |
| 4,098,487 | 7/1978 | Baroa et al. | 526/304 |
| 4,108,802 | 8/1978 | Wright | 526/304 |

FOREIGN PATENT DOCUMENTS

| | | | |
|---|---|---|---|
| 0099694 | 2/1984 | European Pat. Off. | 526/304 |
| 2557451 | 6/1976 | Fed. Rep. of Germany | 526/304 |
| 62-85100 | 4/1987 | Japan | 526/304 |
| 757285 | 9/1956 | United Kingdom | 526/304 |

Primary Examiner—Joseph L. Schofer
Assistant Examiner—N. Sarofim
Attorney, Agent, or Firm—Richard E. Nanfeldt

[57] ABSTRACT

A homogeneous free radical copolymerization process for the formation of a copolymer of acrylamide and a cationic hydrogen-bonding alkoxypropyl which comprises the steps of:

(a) forming a mixture of monomer and the acrylamide-monomer under a nitrogen atmosphere;
(b) adding deoxygenated water to said mixture to form a homogeneous reaction solution;
(c) adding a free radical initiator to said homogeneous reaction solution to initiate polymerization of said acrylamide monomer and said cationic hydrogen-bonding alkoxypropyl monomer; and
(d) copolymerizing said acrylamide monomer and said monomer at a sufficient temperature and for a sufficient period of time to form said copolymer of acrylamide monomer and without the formation of substantial amounts of particulates or phase separation occurring, said copolymer having an intrinsic viscosity of about 1 to about 10 dl/g. said copolymer having the formula:

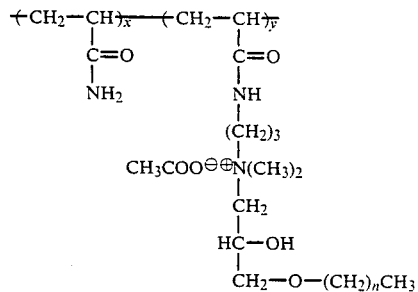

wherein n is 6 to 22 straight chained or branched alkyl or cycloalkyl group. X is about 90 to about 99.9 mole % and y is about 0.1 to about 10.0 mole %.

7 Claims, 3 Drawing Sheets

CATIONIC-HYDROGEN BONDING TYPE HYDROPHOBICALLY ASSOCIATING COPOLYMERS

BACKGROUND OF THE INVENTION

Polymeric materials are generally considered useful as viscosification agents when dissolved in an appropriate solvent system. The major reason for this viscosity enhancement is due to the very large dimensions of the individual polymer chain as compared to the dimension of the single solvent molecules. Any increase in the size of the polymer chain will produce a corresponding enhancement in the viscosity of the solution. This effect is maximized when the polymer is dissolved in a "good" solvent. Therefore, in general, a hydrocarbon soluble polymer is useful for thickening hydrocarbon solvents, while a water soluble polymer is appropriate for increasing the viscosity of aqueous systems. With regard to aqueous solutions, water soluble nonionic polymers and low charge density sulfonated ionomers are quite useful in this regard and are commonly used materials. However, the solution properties of the former family of materials are controlled primarily through modification of the molecular weight of the polymer and through changes in the level of dissolved polymer. These materials become especially effective at concentrations where the individual polymer chains begin to overlap. This "transition" is commonly referred to in the literature as the chain overlap concentration or simply $C^*$. It should be noted that in most nonionic polymers of commercial interest, a relatively large amount of polymer is required prior to reaching $C^*$. Therefore, this approach is undesirable from an economic viewpoint. Moreover, the rheological properties of many of these nonionic systems have been published. The results of these studies show that, in general, these solutions are shear thinning over all shear rates investigated.

It should be noted that polyelectrolytes are very useful and the most commonly used materials. However, the solution properties of these materials begin to deteriorate as low molecular additives (i.e., acids, bases or salts) are dissolved in the solution. These additives screen the charges that are fixed along the chain backbone which results in a decrease in the dimensions of the polymer molecule. The viscosity diminishes as long as the chain continues to shrink.

It has been found previously (U.S. Pat. Nos. 4,460,758 and 4,540,496), for example, that ampholytic ionomers, composed of a nonstoichometric ratio of anionic and cationic monomer units, can be quite useful in thickening a broad variety of aqueous solutions, as, indeed, is necessary for the appropriate rheological control of well control and workover fluids, completion fluids, drag reduction, enhanced oil recovery, acid gelation and the like. More importantly, these polymeric materials possess markedly higher viscosity in acid, base or brine solutions than in the corresponding fresh water systems. Even more interesting is the finding that these polyampholytes show a corresponding enhancement in viscosity as the level of dissolved acid, base or salt is increased. These rheological properties are unexpected for an ion-containing water soluble polymer since the general tendency of these polymer types is to show a strong decrease in thickening efficiency.

Furthermore, in recent years, interpolymer complexes have received considerable attention in the literature due to their interesting and unique properties and their similarity to certain biological systems. In most instances, these complexes are formed by intimately mixing aqueous solutions containing high-charge density polyelectrolytes possessing opposite charge. When these polymer molecules meet in solution, the interaction between oppositely charged sites will cause the release of their associated counterions forming the complex. The counterions are now free to diffuse into the bulk solution. Normally, phase separation occurs on prolonged standing.

Significantly, these interpolymer complexes are normally 1:1 compositions of the polyanions and polycations. The neutrally charged complex swells and absorbs both water and electrolyte when immersed in aqueous electrolyte solutions of increasing concentration. Nonstoichometric complexes, on the other hand, behave as a rather conventional ion-exchange resin in electrolyte solutions. In these specific instances, dissolution does not occur in these high ionic strength media nor in a salt-free environment. In fact, the latter complex can be cold-drawn and deformed as easily as a conventional thermoplastic resin. However, A. S. Michael (I&EC, 57, 32 [1965] has shown these "intractable polysalt precipitates" can dissolved (i.e., codissolved without reaction) in selected ternary solvent mixtures comprising water, water-miscible organic solvent (e.g., acetone) and a strongly ionized inorganic electrolyte (e.g., NaBr). These solutions do yield a homogeneous, transparent viscous solution. It is further noted that a soluble complex is formed in an aqueous solution with the addition of an excess high-charge density polyelectrolyte (E. Tsuchida et al., J. Polymer Sci., Polym. Chem. Ed., 10. 3397 (1972). To the authors, knowledge, few studies have focused on the viscosification aspects of these materials and even less work appears on low-charge density polycomplexes. In these studies, viscosity is used only as a tool to study the extent and mechanism of complex formation.

In previous U.S. patents (U.S. Pat. Nos. 4,615,393 and 4,665,115) it is reported that low-charge interpolymer complexes are soluble and effective in viscosifying aqueous solution systems. More importantly, these complexes possess a substantially higher viscosity than the corresponding individual low-charge density copolymer components. As detailed earlier, these characteristics are unexpected since high-charge density complexes are insoluble in these conventional solution systems. Therefore, it is anticipated that few detailed rheological studies of these latter materials appear in the literature. In particular, shear rate measurements are markedly absent.

Even more interesting is the unique and unexpected result that these soluble interpolymer complexes are very effective in enhancing the viscosity of aqueous solutions over a broad shear rate range. With these unique polymeric materials, dilatant behavior, i.e. shear thickening, occurs in aqueous fluids which are of extreme technological utility. It is further noted that under the identical experimental conditions, the viscosity of the individual copolymer components show the anticipated shear thinning behavior.

The instant invention teaches that a novel family of alkoxypropyl quaternary monomers (derived from glycidal alkyl ether reacting with dimethylaminopropyl methacrylamide) to form a unique family of cationic-hydrogen bonding type hydrophobically associating copolymers. These copolymers are found to be useful in thickening in a very effective manner both fresh water and brine solutions. Even more important is that these copolymers have novel, improved and quite different solution properties as compared to conventional non-ionic polymers and polyelectrolytes. These copolymers are based on, but not limited to, the incorporation of the above cationic monomers into an acrylamide backbone structure.

It is well known that polyacrylamide and hydrolyzed polyacrylamide are water soluble polymers that have been previously disclosed in the literature and have found application in the viscosification of aqueous solutions. This is achieved through a combination of high molecular weight and chain expansion due to repulsion of pendant ionic groups along the polymer chain. However, high molecular weight polymers present well known difficulties in manufacture and subsequent processing because of their irreversible degradation when exposed to conditions of high shear such as would be obtained in the usual stirring devices. Moreover, the presence of pendant ionic groups leads to solution properties which are markedly influenced by the presence of dissolved cations. In particular, the viscosity of solutions of these polymers usually decreases strongly upon increasing concentrations of brine.

This invention teaches that an alternative means for providing polymers which viscosify water or brine at low concentrations. This method relies on the incorporation of a small amount of hydrophobic groups into a polymer with a water soluble backbone. These hydrophobic groups tend to associate with one another in an aqueous solutions, and when the association occurs intermolecularly, the solution viscosity may be increased relative to the polymer without the hydrophobic side groups. An additional benefit is that the solution viscosity is relatively insensitive to salts because the hydrophobic groups are not ionic. A further benefit is the ability to easily incorporate these hydrophobic-type monomers into the polymer structure due to the water solubility of these said monomers. The cationic and hydrogen-bonding ability of these monomers facilitate water soluble and as a result, polymerizability.

The synthesis of copolymers composed of water soluble and water insoluble monomers presents difficulties. In order for polymerization to be effected, the monomers must obviously come into close proximity to one another. A variety of processes based upon prior rt could conceivably achieve this, but have serious deficiencies, necessitating the instant invention. For example, simply dispersing the water insoluble monomer as fine particles in the aqueous medium, while dissolving the water soluble monomer in water would result in poor incorporation of the water insoluble monomer and would lead to a heterogeneous product of particles dispersed in the predominantly water soluble polymer. This would therefore require the extra step of separating the unreacted monomer particulates from the reaction product.

Conventional emulsion polymerization, which uses a surfactant to disperse the water insoluble monomer into the aqueous medium containing the dissolved water soluble monomer, has other disadvantages. In this process, the bulk of the water insoluble monomer is contained initially in droplets which are at least one micron in diameter. These droplets must be stabilized against coalescence by a combination of agitation and added surfactant. The product copolymer is usually in the form of particulates with diameters on the order of 500 to 2000 Å in diameter.

Alternatively, both monomers may be dissolved in a solvent or solvent mixture having properties intermediate between water and a hydrocarbon solvent. Although this undoubtedly allows the comonomers to come into close proximity to one another, since the dispersion is on a molecular scale, this process presents other difficulties. For example, often the copolymer is insoluble in the mixed solvent which is capable of solubilizing the monomers. This leads to precipitation of the copolymer when it has a molecular weight which is still too low to produce efficient viscosification. The reaction product is usually heterogeneous which therefore requires a disadvantageous additional processing step. Furthermore, the water miscible solvents such as alcohols, acetone, ethers and acetic acid are fairly good chain transfer agents and when used in reasonable quantities would lead to decreased molecular weights and hence poor viscosification efficiency.

It should be noted in this regard that the use of hydrophobic groups on water soluble polymers to enhance the rheological properties of water based fluids has been described. One approach to provide polyacrylamide based systems containing hydrophobic groups is described by Bock, et al., U.S. Pat. Nos. 4,520,182 and 4,528,348. Water soluble acrylamide copolymers containing a small amount of oil soluble or hydrophobic alkylacrylamide groups were found to impart efficient viscosification to aqueous fluids. Landoll, U.S. Pat. No. 4,304,902, describes copolymers of ethylene oxide with long chain epoxides which also required relatively large polymer concentration (approximately 1%) for thickening water and required surfactants for solubility due to irregularities in the polymerization. In a related case, U.S. Pat. No. 4,428,277, modified nonionic cellulose ether polymers are described. Although these polymers show enhanced viscosification relative to polymers not containing hydrophobic groups, the viscosification efficiency was very low, requiring 2 to 3 weight percent polymer to provide an enhancement. The use of surfactants to enable solubility and, in turn, viscosification, by a water soluble polymer containing hydrophobic groups is described by Evani, U.S. Pat. No. 4,432,881. The hydrophobic groups claimed are attached to the polymer via an acrylate linkage which is known to have poor hydrolytic stability. In addition, the need for a surfactant to achieve solubility and thickening efficiency should make such a system very salt sensitive, as well as very sensitive to small changes in surfactant and polymer concentrations. Emmons, et al., U.S. Pat. No. 4,395,524, teaches acrylamide copolymers as thickeners for aqueous systems. While these polymers possess hydrophobic groups they are prepared using alcohol containing solvent which are known chain transfer agents. The resulting polymers have rather low molecular weights and, thus, relatively high polymer concentrations are required to achieve reasonable viscosification of water based fluids.

SUMMARY OF THE INVENTION

A process for producing copolymers of water soluble monomers with water soluble cationic-hydrogen bonding-hydrophobically associating monomers has been discovered to yield efficient viscosifiers of aqueous media. The process relies on the complete solubilization of the water soluble hydrophobically associating monomers by means of a cationic charge and hydrogen bonding group chemically bound to the alkyl-containing monomer. As a result, the hydrophobic monomer is completely capable of producing a clear, uniform homogeneous mixture in the presence of the other well-known water soluble monomers and which remains clear, uniform and a homogeneous mixture with no phase separation as the polymerization reaction proceeds toward completion. These cationic-type monomers may form micelles which are minute aggregates, consisting of on the order of 50–200 individual monomer entities. This is accomplished without the need of any other surfactant as in micellar and microemulsion type polymerizations. The former micelles are stable toward phase separation and are effectively dispersed on a very fine scale so that the copolymerization is effected without the formation of latexes or fine particulates.

The copolymers which may be isolated from the reaction mixture, form aqueous solutions which are very efficient viscosifiers of water or brine, having molecular weights such that their intrinsic viscosities are greater than about 1 dl/g, but not so high that they are extremely susceptible to shear degradation.

DETAILED DESCRIPTION OF THE INVENTION

Figure 1:
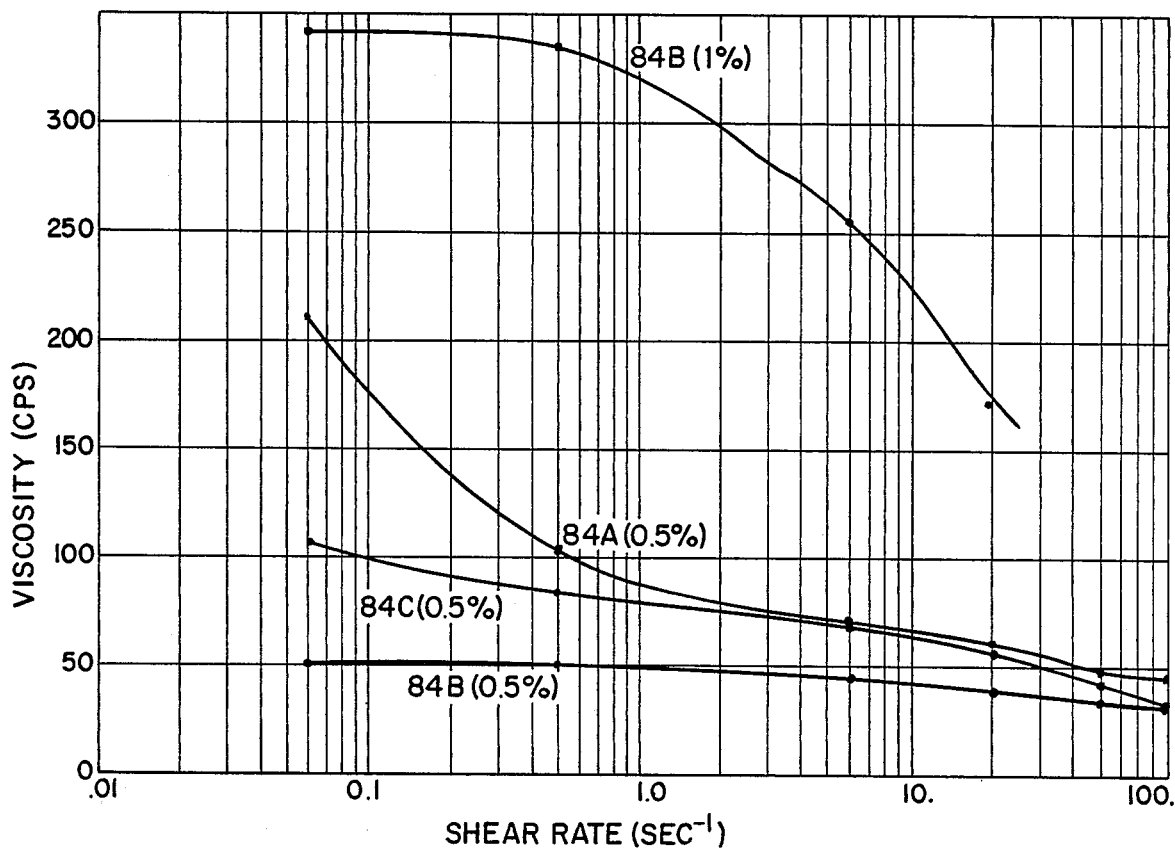
FIG. 1 illustrates a plot of viscosity versus shear rate for an acrylamide/11868-84A and B copolymers prepared by the homogeneous, surfactant-free solution polymerization process.

The process of this invention overcomes the difficulties experienced in conventional polymerizations just described. In particular, it enables the copolymerization of the water soluble monomer, such as acrylamide, and water soluble monomers such as a cationic, hydrogen-bonding, hydrophobically associating derived from alkyl propyl quaternary ammonium salts to give copolymers which are efficient aqueous viscosifiers.

The process relies on the solubility of these alkyl derivatives into a predominantly aqueous media. These cationic derivatives form micelles without the utilization of any other surfactant. The reaction mixture is isotropic, clear, and homogeneous.

These micellar reaction mixtures are free of visible oil droplets or particulates of the water insoluble monomer. The polymerization can therefore be initiated by water soluble initiators to give copolymers that are substantially free of visible particulates. The resultant reaction product remains homogeneous throughout the course of the reaction.

Micelles formed by the cationic hydrogen-bonding hydrophobically associating monomers which are water soluble are generally very small aggregates which consist of on the order of 50 to 200 molecules. They form spontaneously upon mixing the components together, i.e., they do not require the vigorous mixing conditions required in conventional emulsion polymerization in which macroemulsions are formed. The macroemulsion droplets of the conventional emulsion polymerization process have diameters which are at least 10,000 Å. They therefore tend to phase separate upon standing, leading to undesirable inhomogeneities in the produced copolymer. The homogeneous micellar reaction mixture is, on the other hand, much more stable against demixing than the formulations used in emulsion polymerization processes. Indeed, no stirring is required during the course of the micellar copolymerization the micellar aggregates remain extremely finely dispersed throughout. Moreover, the extremely dispersed nature of the micellar aggregate permits the copolymerization to occur in such away that a water soluble copolymer is produced which does not contain particulates or latexes of water insoluble polymers. These would be detrimental in such applications as secondary oil recovery, which requires a product which is substantially free of pore plugging particulates.

An additional important feature is that the resultant copolymer possess a cationic charge, a hydrogen-bonding moiety and a hydrophobic unit on the polymer chain without the necessity of further chemical post-treatments. Besides the ease of polymerization to form these hydrophobically associating polymers, the cationic and alkyl group, i.e. hydrophobic entity, gives one a great degree of control of the final polymer structure and of course, physical properties. Surfactants, although unnecessary as described above, can still be used.

The surfactants which may be used in this process may be one of the water soluble surfactants such as salts of alkyl sulfates, sulfonates, carboxylates and the like, or nonionic such as ethylene oxide-propylene oxides copolymers, or polyoxyethylene alkyl ethers, etc., or cationic surfactants such as primary alkylamines, dialkyl secondary amines, or ethoxylated fatty amines. Suitable surfactants may be chosen from these on the basis of water solubility and solubilization capacity for any other water insoluble monomers intentionally added to the polymerization mixture.

Suitable free radical initiators for the copolymerization process are peroxides such as hydrogen peroxide, potassium persulfate, alkyl peroxides and the like. The concentration of the free radical initiator is about 0.01 to about 0.50 grams per hundred grams of acrylamie and alkylacrylamide monomer. The polymerization is conducted in the absence of oxygen at a temperature of about 20° to about 100° C. The polymer may be recovered from the reaction mixture by precipitation by nonsolvents such as acetone.

The water soluble copolymers which are produced by the copolymerization process in the instant invention are characterized by the formula:

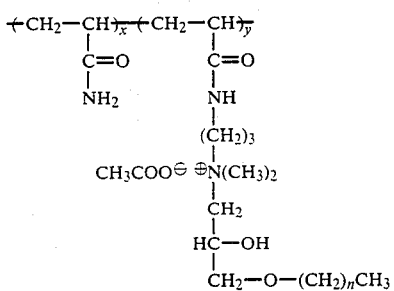

wherein n is preferably 6 to 22 straight chained or branched alkyl or cycloalkyl group, more preferably 6 to 20 and most preferably 6 to 18.

Typically, but non-limiting examples of preferred alkyl groups are hexyl, octyl, decyl, dodecyl and steryl groups. X is preferably about 90.0 to 99.9 mole %, more preferably about 95.0 to about 99.8 mole %, and most preferably about 97.0 to about 99.5 mole %. These water soluble copolymers are of a sufficiently high molecular weight that they are efficient viscosifiers of water or brine, but not so high that they are readily susceptible to irreversible shear degradation. That is, their intrinsic viscosity is greater than 1 dl/g and less than about 10 dl/g.

DESCRIPTION OF THE PREFERRED EMBODIMENT

The following examples explain the invention, which are by way of illustration, but not of limitation.

EXAMPLE 1

Synthesis of Cationic Hydrogen-Bonding Hydrophobic Monomer

Two representative examples for the synthesis of the following monomer structures which are subsequently copolymerized to form lightly cationic alkoxypropyl quaternary ammonium salts containing water soluble copolymers are described below.

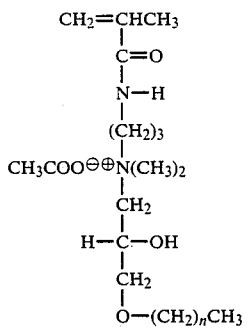

In these representative examples n=7 (11868-65A) and n=3 (11868-65B), respectively.

Into a small round bottom flask add 63.6 mls of 2-propanol and the following materials.

5.7 mls glacial acetic acid 17.0 g dimethylaminopropyl methacrylamide
Heat solution to 50° C., then add slowly
18.6 g glycidyl n-octyl ether (11868-65A) or
13.0 g 2,3 epoxypropylbutyl ether (11868-65C)
over a 30 minute time frame.

Continually heat the solution for 1 hour, then slowly cool to room temperature and continue agitation for about 24 hours. Subsequently distill off acetic acid. Elemental N.M.R. and infrared analysis confirms that the monomers produced, i.e., 65A or 65, have the following structures (purity >90%).

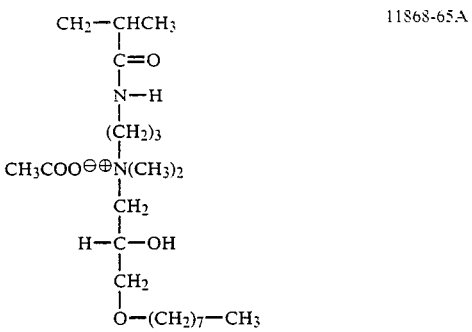

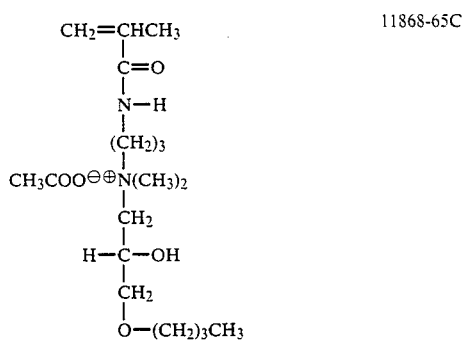

These monomers are both completely water soluble to high concentrations producing in one instance (11868-65A) an aqueous solution having a remarkably low surface tension and the other (11868-65B) monomer producing little reduction in the surface tension. Interestingly, these differences in properties of the monomers are also reflected in the properties of the copolymers formed with these monomers.

EXAMPLE 2

Copolymer Synthesis

A representative example (11868-84A) for the synthesis of an acrylamide copolymer containing 11868-65A monomer is described below.

Into a 1 liter-4 neck round bottom flask add:
500 mls distilled water
47.0 g acrylamide (99 mole %)
2.8 g 11868-65A (1 mole %)
0.1 g Vazo 33 (DuPont$^R$ product)*

*Vazp 33 is 2,2'azobis (2,4-dimethyl-4-methoxyvaleronitrile)

The solution mixture is purged for 2 hours with argon gas at room temperature and subsequently the Vazo 33 initiator is dissolved into the monomer solution. After 24 hours, the copolymer is precipitated from solution with a large excess of acetone. Subsequently, the copolymer is extensively washed with a large excess of acetone and dried in a vacuum oven at 60° C. for about 48 hours.

Similar procedure is used for forming the 11868-65C containing copolymer (11868-84B).

EXAMPLE 3

Physical Properties

FIG. 1 shows the viscosity-shear rate data of the previously described copolymers synthesized with monomers 11868-65A (octyl moiety) and 11868-65C (butyl moiety). A close examination of 11868-84B copolymer containing the butyl moiety has excellent viscometrics as the concentration of polymer is increased by 0.5 g/dl. Interestingly, the data shows that this copolymer is shear thinning over the shear rate examined and that no time dependencies of viscosity are observed. On the contrary, the 11868-84A copolymer containing the octyl moiety displays pronounced viscosity-time effects at low shear rates. It is quite apparent that by simply increasing the alkyl length by four "carbon" atoms changes in a very dramatic fashion the rheological properties of the aqueous fluid. This is an important result and the effect has important implications in controlling fluid rheology in a variety of oil and gas drilling operations.

Figure 2:
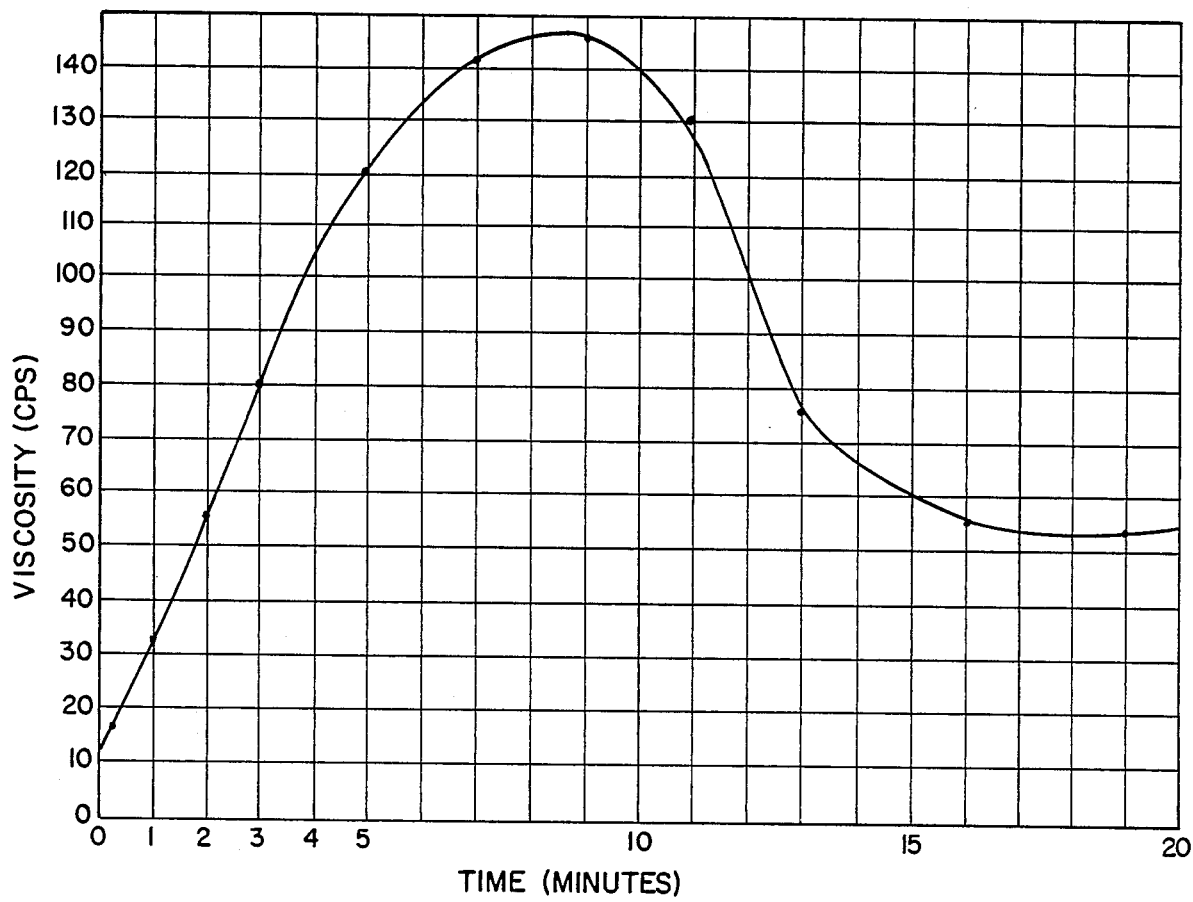
FIG. 2 illustrates a plot of viscosity versus time for an acrylamide/11868-84A copolymer prepared by the homogeneous, surfactant-free, solution polymerization process. Shear rate is 0.06 sec.$^{-1}$, polymer concentration is 0.25 g/dl, and 2% salt (NaCl) concentration.

Even more interesting is the observation that the 11868-84A copolymer displays high viscosity values as the ionic strength of aqueous fluid is increased. Moreover, very dramatic time dependencies of the rheological properties occurs with increasing salt levels (FIG. 2). In these instances, a viscosity increase is noted followed by a slow decay in the viscosity leveling off at a value higher than the original unsheared solutions.

Figure 3:
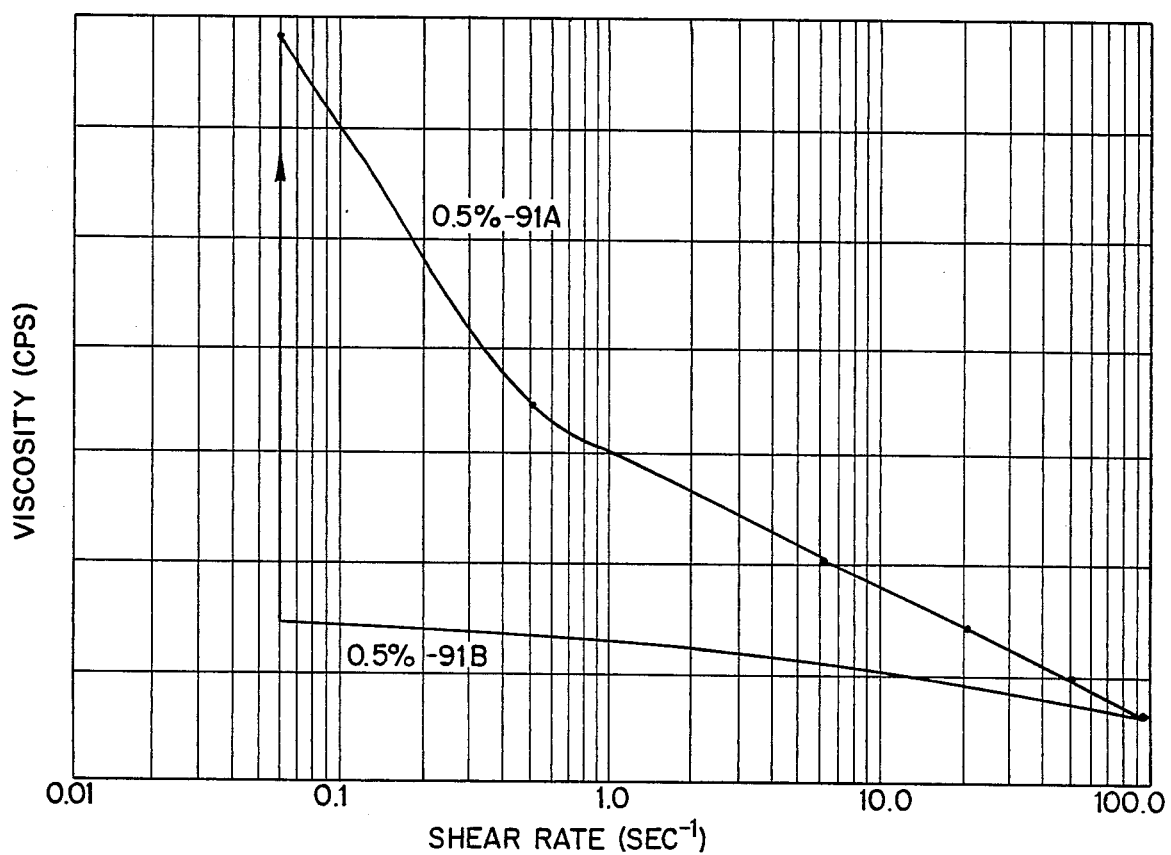
FIG. 3 illustrates a plot of viscosity versus shear rate for an acrylamide/11868-91A and 91B (n=17) copolymers prepared by the homogeneous, surfactant-free, solution polymerization process. Solvent is water, polymer concentration is 0.5 g/dl.

These specific rheological properties of these materials are anticipated to depend strongly on molecular weight, polymer concentration, brine concentration and, of course, the level of the 11868-65A or 11868-65C etc. (i.e. other monomers with variable n). These latter effects are shown in FIG. 3 where copolymers were synthesized with approximately 2 mole % of either 11868-65A (11868-91A copolymer) or 11868-65C (11868-91B copolymer). Again the octyl moiety displays pronounced time dependencies at low shear rate and high viscosity. Now, however, the butyl moiety is just beginning to display a very modest viscosity time dependency. Again, it is observed that modest structural modifications produced rather large changes in rheological properties.

EXAMPLE 4

Solubility

Interestingly, copolymer insolubility occurs at approximately 3 mole to 5 mole % of the 11868-65A (octyl moiety).

In summary the use of these novel copolymers to impart improved rheological properties to fresh water and brine solutions is desirable. The properties of the aqueous fluids containing these copolymers can be varied over a broad range due to the ability to readily modify a number of structural parameters in the copolymer structure, i.e. level of alkoxypropyl quaternary monomer units, molecular weight, length of the alkyl moiety (n) and the like.

It is anticipated that these copolymers are useful as rheological control additives in a variety of drilling fluids, water treatment additives, well control and workover fluids, completion fluids, cutting fluids, drag reducing agents, antimisting additives and the like. Included in these applications is enhanced oil recovery, water based lubricant additive, membrane, water borne coatings and the like.

What is claimed is:

1. A homogeneous free radical copolymerization process for the formation of a copolymer of acrylamide and a cationic hydrogen-bonding alkoxypropyl quaternary monomer which comprises the steps of:
   (a) forming a mixture of the said monomer and the acrylamide monomer under a nitrogen atmosphere;
   (b) adding deoxygenated water to said mixture to form a homogeneous reaction solution;
   (c) adding a free radical initiator to said homogeneous reaction solution to initiate polymerization of said acrylamide monomer and said alkyl acrylamide monomer; and
   (d) copolymerizing said acrylamide monomer and said monomer at a sufficient temperature and for a sufficient period of time to form said copolymer of acrylamide monomer and without the formation of substantial amounts of particulates or phase separation occurring, said copolymer having an intrinsic viscosity of about 1 to about 10 dl/g. said copolymer having the formula:

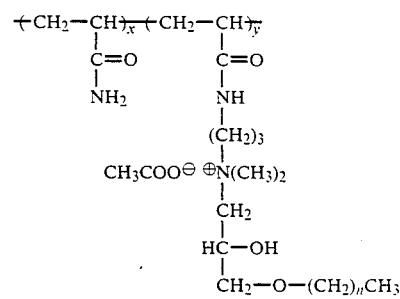

wherein n is 6 to 22 straight chained or branched alkyl or cycloalkyl group. X is about 90 to about 99.9 mole %, and y is about 0.1 to about 10.0 mole %.

2. A process according to claim 1 wherein said copolymer is water soluble.

3. A process according to claim 1 or 2 further including recovering said copolymer from said reaction solution.

4. A process according to claim 1 or 2 wherein the ($CH_{2N}CH_3$) group of the cationic, hydrogen-bonding alkoxypropyl quaternary monomer is selected from the group consisting of hexyl, octyl, decyl, dodecyl and hexadecyl groups.

5. A process according to claim 1 or 2 wherein said free radical initiator is selected from the group consisting of potassium; sodium thiosulfate, potassium persulfate mixture, and benzoylperoxide.

6. A process according to claim 1 or 2 wherein said polymerization is carried out at about 0° to about 70° C. for about 1 to about 48 hours.

7. A process according to claim 1 or 2 wherein a concentration of said acrylamide monomer and said cationic hydrogen-bonding monomer derived from alkoxylpropyl quaternary ammonium salts in said reaction solution is about 1.0 to about 50.0 grams of said acrylamide monomer and said alkyl acrylamide monomer per 100 grams of water.

* * * * *